United States Patent Office 3,110,542
Patented Nov. 12, 1963

3,110,542
TREATMENT OF WOOL WITH ACID CHLORIDES IN THE PRESENCE OF γ-BUTYROLACTONE
Nathan H. Koenig, Berkeley, Calif., assignor to the United States of America as represented by the Secretary of Agriculture
No Drawing. Filed Mar. 15, 1962, Ser. No. 180,054
10 Claims. (Cl. 8—128)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool by reacting it with an organic acid chloride. In particular, the invention concerns and has as its prime object the provision of processes wherein the reaction of wool with organic acid chlorides is conducted in the presence of γ-butyrolactone whereby to facilitate and promote the said reaction. Further objects and advantages of the invention will be apparent from the following description wherein parts and percentages are by weight, unless otherwise specified.

Prior to this invention it has been advocated that wool be modified by applying an organic acid chloride to the wool, followed by baking the acid chloride-impregnated wool in an oven. In another technique, the wool is heated with a solution of acid chloride in an organic solvent such as benzene or carbon tetrachloride. Under these conditions only a minor amount of acid chloride actually reacts with the wool so that the degree of modification is low.

In accordance with the present invention, wool is reacted with an acid chloride in the presence of γ-butyrolactone. The latter compound catalyzes the actual chemical combinaiton of the wool and the acid chloride reactant. As a result, one is enabled to readily prepare wools containing substantial proportions of combined acid chloride and having correspondingly improved properties.

γ-Butyrolactone exhibits certain characteristics which favor its use as a catalyst for the reaction in question. Among these are a high boiling point (204° C.), a low vapor pressure, and a low order of toxicity. The high boiling point of the compound is advantageous in that the wool-acid chloride reaction can be conducted at high temperatures without requiring pressure-tight vessels or other special apparatus. The low vapor pressure of the compound is advantageous in reducing fire hazard. Further, γ-butyrolactone is a stable compound and does not react to any material extent with wool. In sum, the characteristics of γ-butyrolactone indicate that it is a very useful catalyst for the modification of wool with acid chlorides.

The unusual and effective action of γ-butyrolactone as a catalyst for the reaction of acid chlorides with wool is exemplified by the following comparative tests: (a) Dry wool (1.2 g.) and lauroyl chloride (6 ml.) were heated for 60 minutes at 105° C. The wool was extracted with acetone and ethanol to remove unreacted reagents and dried. It was found that the increase in weight of the wool was only 4%. (b) Dry wool (1.2 g.) and γ-butyrolactone (6 ml.) were heated at 105° C. for 60 minutes. The wool was extracted as described above and dried. The change in weight of the wool was 0%. (c) Dry wool (1.2 g.) was heated with lauroyl chloride (3 ml.) and γ-butyorolactone (3 ml.) at 105° for 60 minutes. The wool was extracted as described above and dried. In this case, the increase in weight of the wool, due to reaction with the acid chloride, was 24%.

The fact that γ-butyrolactone acts as a catalyst rather than a mere solvent is demonstrated by the following experimental data: Dry wool (1.2 g.), lauroyl chloride (3 ml.), and γ-butyolactone (3 ml.) were heated for 45 minutes at 120° C. The wool was extracted with acetone and ethanol to remove unreacted reagents and dried. It was found that the increase in weight of the wool, due to reaction with the acid chloride, was 31%. A series of experiments were then carried out under the same conditions but substituting for the γ-butyrolactone the same volume of the following solvents: acetophenone, o-dichlorobenzene, and xylene. In these runs, the increase in weight of the wool was only 2%.

Carrying out the process of the invention essentially involves contacting wool with an acid chloride in the presence of γ-butyrolactone. The reaction conditions such as proporton of reagents, specific acid chloride used, time, temperature, etc., are not critical but may be varied to suit individual circumstances without changing the basic nature of the invention. The proportion of γ-butyrolactone may be varied widely and may be as low as 0.1 volume per volume of acid chloride. In the case of acid chlorides which are normally solid, the volume considered is that of the molten (liquefied) compound. Usually, it is preferred to use a larger proportion of γ-butyrolactone, i.e., about 0.2 to 5 volumes thereof per volume of acid chloride, to attain an increased reaction-promoting effect. The temperature of reaction may be about from 25° to 140° C. The reaction rate is increased with increasing temperature and a preferred temperature range to expedite the reaction without damage to the wool is 105–125° C.

It is preferred to carry out the reaction under anhydrous conditions, thereby to ensure reaction between the wool and the acid chloride. The degree of modification of the wool is influenced by the proportion of acid chloride taken up by the fiber, that is, the higher the uptake of acid chloride the greater will be the modification of the wool. In general, the uptake of acid chloride may be varied about from 1 to 35% by weight. In conducting the reaction, the acid chloride reactant is generally employed in excess over the amount desired to be taken up by the fiber. The time of reaction will vary depending on the proportion of γ-butyrolactone, temperature of reaction, reactivity of the acid chloride selected, and the degree of modification desired. In general, the reaction may take anywhere from a few minutes to several hours.

The process in accordance with the invention may be carried out in various ways. For example, the wool may be directly contacted with the γ-butyrolactone and acid chloride reactant and the reaction mixture preferably heated as indicated above to cause the acid chloride to react with the wool. In the alternative, the wool may be pretreated with γ-butyrolactone and the acid chloride then added to the mixture and the reaction carried out as previously described.

After reaction of the wool with the acid chloride, the chemically modified fiber is preferably treated to remove excess acid chloride, γ-butyrolactone, and solvent, if such is used. Thus, the wool may be treated as by wringing, passage through squeeze-rolls, centrifugation, or the like to remove the excess materials. In place of such mechanical action, or following it, the product may be extracted with a solvent such as trichloroethylene, benzene, acetone, carbon tetrachloride, etc. Successive extractions with different solvents may be used to ensure complete removal of all unreacted materials. The treated wool is then dried in the usual way.

By treating wool with the acid chloride reagent as above described, the wool is chemically modified because there is a chemical reaction between the acid chloride and the protein molecules of the wool fibers. As a result, the modified wool exhibits many advantageous properties over normal wool, as illustrated below:

An outstanding feature is the resistance of the modified wool to acids as indicated by its decreased solubility in hot hydrochloric acid. This factor enables the modified wool to be useful in applications where the product comes into contact with acid materials. For example, wool may encounter acid conditions during manufacturing processes such as carbonizing to remove burrs; dyeing in acid dye baths; and fulling with acid media. The more resistant the wool is to such acid environments, the greater will be its subsequent mechanical strength and wear resistance.

The tendency of wool to shrink when subjected to washing in aqueous media has long been a deterrent to the more widespread use of wool. An important advantage of the invention is that it yields modified wools which have a decreased tendency to shrink when subjected to washing with conventional soap and water or detergent and water formulations.

Although the properties of the chemically modified wool indicate beyond question that actual chemical combination between the wool and the acid chloride has taken place, it is not known for certain how the wool and acid chloride moieties are joined. It is believed, however, that the acid chloride reacts with some of the sites on the wool molecule where there are reactive hydrogen atoms, e.g., amino, hydroxyl, thiol, and phenolic groups. When the reaction is carried out with polybasic acid chlorides—for example, sebacoyl chloride—combination with the wool may establish cross-links between protein molecules of the wool that further increase the resistance of the fibers to chemical attack. It is to be particularly noted that the reaction in accordance with the invention does not impair the wool fiber for its intended purpose, that is, for producing woven or knitted textiles, garments, etc.

The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The catalytic ability of $\gamma$-butyrolactone is not restricted to any particular acid chloride or class of acid chlorides. Consequently, the invention may be applied in the reaction of wool with all types of organic acid chlorides. Particularly preferred are the aliphatic, aromatic, or aromatic-aliphatic compounds containing one or more chloroformyl (—COCl) groups. These compounds may be hydrocarbon acyl chlorides or may contain substituents on the hydrocarbon residue such as halogen (chlorine, bromine, iodine, or fluorine), ether groups, ester groups, nitro groups, carboxy groups, etc. Examples of compounds coming within the purview of the invention are listed below by way of illustration and not limitation:

Typical examples of compounds in the category of aliphatic acid chlorides are acetyl chloride, propionyl chloride, butyryl chloride, isobutyryl chloride, valeryl chloride, isovaleryl chloride, trimethylacetyl chloride, caporyl chloride, caprylyl chloride, capryl chloride, lauroyl chloride, myristoyl chloride, palmitoyl chloride, stearoyl chloride, arachidoyl chloride, acrylyl chloride, crotonyl chloride, vinylacetyl chloride, methacrylyl chloride, angelyl chloride, oleoyl chloride, elaidoyl chloride, linoleoyl chloride, linolenyl chloride, oxalyl chloride, maleyl chloride, fumaryl chloride, malonyl chloride, succinyl chloride, glutaryl chloride, adipyl chloride, pimelyl chloride, suberyl chloride, azelayl chloride, sebacyl chloride, chloroacetyl chloride, bromoacetyl chloride, iodoacetyl chloride, fluoroacetyl chloride, 9,10-dichloro-octadecanoyl chloride, ethoxyacetyl chloride, carbethoxyacetyl chloride, $\alpha,\beta$-dichlorosuccinyl chloride, 5-(chloroformyl)-valeric acid, cyclohexane-carbonyl chloride, etc. Of the aliphatic acid chlorides, it is preferred to employ the chlorides of aliphatic monobasic acids which contain at least 12 carbon atoms and the chlorides of aliphatic dibasic acids which contain at least 6 carbon atoms. These compounds are preferred as they confer on the treated wool especially desirable properties including resistance to acids, oxidizing agents, and shrinkage.

Typical examples in the category of aromatic acid chlorides are benzoyl chloride, ortho toluyl chloride, meta toluyl chloride, para toluyl chloride, xyloyl chlorides, naphthoyl chlorides, dodecylbenzoyl chloride, orthochlorobenzoyl chloride, methachlorobenzoyl chloride, parachlorobenzoyl chloride, 2,4-dichlorobenzoyl chloride, anisoyl chloride, nitrobenzoyl chlorides, phthaloyl chloride, isophthaloyl chloride, terephthaloyl chloride, p-(chloroformyl)-benzoic acid, etc.

Typical examples in the category of aromatic-aliphatic acid chlorides are phenylacetyl chloride, chlorophenylacetyl chloride, cinnamyl chloride, $\beta$-phenylpropionyl chloride, phenoxyacetyl chloride, etc.

The invention is further demonstrated by the following illustrative examples:

Example I

A series of runs were carried out wherein dry wool flannel was reacted with various acid chlorides in the presence of $\gamma$-butyrolactone. In these runs, the weight of dry wool was 1.2 grams and the temperature of reaction was 125° C. The acid chlorides used, the volume of reagents, the reaction time, and the uptake of acid chlorides are tabulated below:

| Acid Chloride | Volume of acid chloride, ml. | Volume of $\gamma$-butyrolactone, ml. | Reaction time, min. | Uptake of acid chloride, percent |
|---|---|---|---|---|
| Myristoyl chloride | 3 | 3 | 30 | 28 |
| Stearoyl chloride | 3 | 3 | 60 | 28 |
| Phenylacetyl chloride | 1 | 5 | 30 | 17 |

Example II

The acid solubility of modified wools produced in accordance with the invention and that of untreated wool were determined in the following way: The wool sample is immersed in 5 N hydrochloric acid for one hour at 65° C. The loss in weight of the sample is then determined after thoroughly washing the acid-soaked wool. The increased resistance of modified wools to hot hydrochloric acid is illustrated by the data below:

| Acid Chloride | Uptake of acid chloride by wool, percent | Acid solubility, percent |
|---|---|---|
| None (untreated wool) | 0 | 13 |
| Lauroyl chloride | 25 | 5 |
| Myristoyl chloride | 28 | 5 |

Example III

Tests were carried out to determine the improvement in shrinkage characteristics of the modified wools. The shrinkage tests were carried out as follows: The wool samples were milled at 1700 r.p.m. for 2 minutes at 40–42° C. in an "Accelerotor" with .9% sodium oleate solution, using a liquor to wool ratio of 50 to 1. After this washing operation, the samples were measured to determine their area. The improvement in shrinkage properties of wool modified in accordance with the invention is demonstrated by the following data:

| Acid Chloride | Uptake of acid chloride, percent | Area shrinkage, percent |
| --- | --- | --- |
| None (untreated wool) | 0 | 43 |
| Lauroyl chloride | 28 | 3 |
| Stearoyl chloride | 26 | 3 |

Having thus defined the invention, what is claimed is:

1. A process for chemically modifying wool which comprises reacting wool under essentially anhydrous conditions, in the presence of $\gamma$-butyrolactone, with an acid chloride of the class consisting of aliphatic, aromatic, and aromatic-aliphatic acid chlorides.
2. The process of claim 1 wherein the acid chloride is an aliphatic mono-basic acid chloride containing at least 12 carbon atoms.
3. The process of claim 1 wherein the acid chloride is lauroyl chloride.
4. The process of claim 1 wherein the acid chloride is myristoyl chloride.
5. The process of claim 1 wherein the acid chloride is palmitoyl chloride.
6. The process of claim 1 wherein the acid chloride is stearoyl chloride.
7. The process of claim 1 wherein the acid chloride is an aliphatic dibasic acid chloride containing at least 6 carbon atoms.
8. The process of claim 1 wherein the acid chloride is adipyl chloride.
9. The process of claim 1 wherein the acid chloride is suberyl chloride.
10. The process of claim 1 wherein the acid chloride is sebacyl chloride.

References Cited in the file of this patent
UNITED STATES PATENTS

| 2,888,313 | Mautner | May 26, 1959 |
| 2,993,748 | Koenig | July 25, 1961 |